United States Patent [19]

Patnode et al.

[11] Patent Number: 5,397,614
[45] Date of Patent: Mar. 14, 1995

[54] PRESSURE SENSITIVE ADHESIVE COMPOSITION WHICH IS WATER DISPERSIBLE UNDER ALKALINE PH CONDITIONS

[75] Inventors: Gregg A. Patnode, Woodbury; Donald R. Battles, Arden Hills, both of Minn.; Francois C. D'Haese, Brabantdam, Belgium

[73] Assignee: Minnesota Mining and Manufacturing Company, St. Paul, Minn.

[21] Appl. No.: 93,080

[22] Filed: Jul. 16, 1993

[51] Int. Cl.$^6$ ............................................. C09J 7/02
[52] U.S. Cl. .................................. 428/40; 428/261; 428/350; 428/355; 524/127; 525/223
[58] Field of Search ............... 428/261, 343, 346, 350, 428/355, 40; 524/127; 525/223

[56] References Cited

U.S. PATENT DOCUMENTS

| | | | |
|---|---|---|---|
| 2,838,421 | 6/1958 | Sohl | 117/122 |
| 3,096,202 | 7/1963 | DeGroot von Arx | 117/68.5 |
| 3,152,940 | 10/1964 | Abel et al. | 156/157 |
| 3,441,430 | 4/1969 | Peterson | 117/68.5 |
| 3,763,117 | 10/1973 | McKenna et al. | 260/78.5 |
| 3,865,770 | 2/1975 | Blake | 260/27 R |
| 3,890,292 | 6/1975 | Bohme et al. | 260/80.76 |
| 4,341,680 | 7/1982 | Hauber et al. | 525/329 |
| 4,388,432 | 6/1983 | Eskay | 524/388 |
| 4,413,080 | 11/1983 | Blake | 524/187 |
| 4,413,082 | 11/1983 | Gleichenhagen et al. | 524/243 |
| 4,418,120 | 11/1983 | Kealy et al. | 428/343 |
| 4,569,960 | 2/1986 | Blake | 524/145 |
| 5,125,995 | 6/1992 | D'Haese et al. | 156/155 |

FOREIGN PATENT DOCUMENTS

| | | |
|---|---|---|
| 0118726 | 2/1983 | European Pat. Off. . |
| 0297451 | 1/1989 | European Pat. Off. . |
| 0352442 | 1/1990 | European Pat. Off. . |
| WO/92/04418 | 9/1990 | WIPO . |
| WO/93/03106 | 8/1991 | WIPO . |
| WO/93/06184 | 9/1991 | WIPO . |

*Primary Examiner*—Jenna L. Davis
*Attorney, Agent, or Firm*—Gary L. Griswold; Walter N. Kirn; James V. Lilly

[57] ABSTRACT

A pressure sensitive adhesive which is dispersible at an alkaline pH but not at an acidic or a neutral pH is disclosed. The adhesive is essentially free from plasticizers (i.e., it contains less than 0.1 part of plasticizer per part of polymer).

The polymer is formed from A, B and C monomers. The A monomer is hydrophobic and is an acrylic or methacrylic ester of a non-tertiary $C_2$–$C_{14}$ alcohol. It comprises from 50 to 80 weight % of the polymer.

The B monomer contains β-carboxyethyl acrylate (BCEA) or a salt thereof or a mixture of BCEA or a salt thereof with a vinyl carboxylic acid or a salt thereof. The polymer contains from 10 to 30 weight % of B monomer. The acid groups of the polymer have been neutralized with from 0.5 to 2 equivalents of an alkali metal hydroxide.

The C monomer is an X—Y—Z macromer. X is copolymerizable with the A and B monomers. Y is a divalent linking group. Z is a water dispersible group that contains at least two units which are essentially unreactive under free radical conditions used to form the polymer. C comprises from 10 to 30 weight % of the polymer.

21 Claims, No Drawings

PRESSURE SENSITIVE ADHESIVE COMPOSITION WHICH IS WATER DISPERSIBLE UNDER ALKALINE PH CONDITIONS

FIELD OF THE INVENTION

This invention relates to a water-dispersible pressure sensitive adhesive composition and articles made therefrom.

BACKGROUND OF THE INVENTION

Water-dispersible pressure sensitive adhesive compositions have many uses. For example, such adhesives are useful with garments such as gowns, sheets, drapes, and other mammalian body coverings, etc. which are required during surgery and other aseptic and non-aseptic procedures. Many of these procedures are carried out in the normal operation of hospitals, medical and dental clinics and the like. Additionally, such adhesives are useful with sterilization indicator tapes.

In such applications, it is essential that the adhesive be resistant to body fluids normally encountered during use, yet be dispersible under alkaline conditions such as are commonly encountered during laundering.

A number of water dispersible adhesive systems are known. For example, U.S. Pat. No. 5,125,995 (D'Haese et al), WO 93/06184 (D'Haese), U.S. Pat. No. 4,413,080 (Blake), U.S. Pat. No. 4,569,960 (Blake), and copending application U.S. Ser. No. 07/889,647 filed May 28, 1992 (Patnode et al).

Examples of other water-dispersible pressure sensitive adhesives include U.S. Pat. No. 3,865,770 (Blake), U.S. Pat. No. 3,441,430 (Peterson) and U.S. Pat. No. 2,838,421 (Sohl).

A variety of other pressure-sensitive adhesives are said to be either water-soluble or water-dispersible. See, for example U.S. Pat. No. 4,413,082 (Gleichenhagen et al), U.S. Pat. No. 4,341,680 (Hauber et al), European Patent Publication 0 352 442, U.S. Pat. No. 3,152,940 (Abel et al), U.S. Pat. No. 4,338,432 (Eskay), U.S. Pat. No. 3,096,202 (deGroot von Arx), European Patent Publication 0 297 451 (Knutson et al), U.S. Pat. No. 3,763,117 (McKenna et al), and U.S. Pat. No. 3,890,292 (Bohme et al).

The present invention provides a pressure sensitive adhesive composition and articles that employ the adhesive which can be used in a variety of applications. The adhesive is especially well suited for preparing pressure sensitive adhesives tapes which can be used with products such as gowns, sheets, drapes, etc. used in hospitals and medical and dental clinics. The adhesives can also be used in a variety of other applications such as sterilization indicator tapes and labels.

Summary of the Invention

The present invention provides a pressure sensitive adhesive composition which is dispersible under alkaline pH conditions (e.g., pH $\geq$ about 8) while not being dispersible under neutral or acidic pH conditions. This enables the adhesive to be utilized for a variety of purposes where exposure to water or steam is encountered without having the adhesive fail. For example, the adhesive can be utilized in a sterilization process without losing its pressure sensitive properties. As a result, the adhesives of the invention can be used with tapes used to close a sterilization wrapper. It can also be used with a sterilization indicator to indicate that a wrapped package has passed through a sterilization cycle.

However, the wrappers and tapes that utilize the adhesive of the invention can be laundered because the adhesive of the invention disperses in alkaline laundering solutions. Consequently, the adhesives do not need to be removed prior to laundering. It has been discovered that an acrylate copolymer which employs $\beta$-carboxyethyl acrylate (hereinafter referred to as BCEA) as one of its monomer units and which is grafted with an appropriate amount of water-dispersible segments provides an adhesive that is water-dispersible under alkaline pH conditions without being water-dispersible under neutral or acidic pH conditions. The acrylate copolymer is obtained using macromer technology. It has also been discovered that severely limiting the amount of tackifier and plasticizer employed surprisingly provides an adhesive which retains its adhesive properties over a wide range of conditions.

The present invention provides a pressure sensitive adhesive and articles that employ the adhesive that are steam sterilizable even though being water-dispersible under alkaline pH conditions. Furthermore, the adhesive has improved adhesion to a variety of fabrics without the need to use any significant amount of either a tackifier or a plasticizer.

The adhesive of the invention preferably shows balanced adhesive properties, like peel strength, heat resistance, and shear strength as well as acceptable tack/adhesion to a variety of substrates.

Tapes which utilize the pressure sensitive adhesive composition of the present invention may be provided as transfer tapes (e.g., no backing required), with a backing, etc. If a backing is employed, it may be covered on one or both sides with the pressure sensitive adhesive. The backing material may either be of a material which is dispersible under the same conditions as the pressure sensitive adhesive composition or it may be a polymeric, non-dispersible material. Combinations of backing materials may be employed in the tapes.

In accordance with the present invention there is provided a pressure sensitive adhesive composition which is dispersible at an alkali pH but not at an acidic or neutral pH. The adhesive comprises a polymer formed from A, B, and C monomers. The A monomer is a hydrophobic monomer selected from the group consisting of an acrylic or a methacrylic ester of a non-tertiary alcohol having from 2 to 14 carbon atoms. The A monomer comprises from 50 to 80% by weight of A plus B plus C monomers. The B monomer is selected from BCEA or a salt thereof and mixtures of BCEA or a salt thereof, and other vinyl carboxylic acids or a salt thereof. The B monomer comprises from about 10 to about 30% by weight of A plus B plus C monomers. If a mixture of BCEA and the vinyl carboxylic acid or its salt is used, the BCEA must comprise at least 10% by weight of the polymer. Additionally, the carboxylic acid groups of the polymer have been neutralized with an alkali metal hydroxide. The quantity of the hydroxide used to neutralize the acid groups is from about 0.5 to 2 equivalents of the hydroxide per acid group. The C monomer is a water-dispersible macromolecular monomer which has the formula X—Y—Z. In the C monomer, X is a moiety copolymerizable with A and B, Y is a divalent linking group which joins X to Z and Z is a water-dispersible group which contains at least two units which are essentially unreactive under free radical initiated copolymerization conditions which can be used to form the polymer, and wherein C comprises from 10 to 30% by weight of the A plus B plus C monomers.

While the adhesive can include a variety of other ingredients, it must contain less than about 0.1 part of a plasticizer per part of the polymer. By limiting the amount of plasticizers in this manner, the adhesive retains its adhesive properties, especially its static shear strength.

Retention of shear strength is important to resist the forces encountered by the adhesive in many applications. For example, wrapped bundles of gowns, sheets, drapes and the like exert pressure on the closures. Additionally, the tape used to close a bundle of items is exposed to an increased shear load during the sterilization process. Consequently, it is important that the adhesive be able to withstand this shear.

As used herein, the term "water-dispersible" means that the respective compositions are capable of being either dispersed in or dissolved in water under conditions described hereinafter.

The terms "macromer" and "macromolecular monomer" are used interchangeably and mean a monomer which is an oligomeric polymeric material with a weight average molecular weight of 300 to 30,000, preferably 350 to 5,000, more preferably from 400 to 750 and having a polymerizable group.

The phrase "pressure sensitive adhesive" (PSA) is used herein to mean a composition which adheres two substrates together with, at most, the application of low pressure at room temperature.

DETAILED DESCRIPTION

The pressure sensitive adhesive of the present invention is water-dispersible under alkaline pH conditions (e.g., pH $\geq 8$) when tested as described below. The composition utilizes, as an essential ingredient, a polymer formed by the copolymerization of A, B and C monomers. The polymers of the invention are preferably terpolymers. These polymers typically have an inherent viscosity (IV) at 27.5° C. in 2-butanone of from 0.2 to over 2 dl/g. Preferably the IV is in the range of 0.7 to 1.5 dl/g. Most preferably the inherent viscosity is in the range of from 0.9 to 1.4 dl/g.

The A monomer useful in preparing the terpolymer is a hydrophobic monomeric acrylic or methacrylic ester of a non-tertiary alcohol, which alcohol contains from 2 to 14 carbon atoms and preferably from 4 to 12 carbon atoms. It is preferred that the non-tertiary alcohol be an alkyl alcohol. The term "hydrophobic" is used herein to mean that the A monomer lacks substantial affinity for water, that is, it neither substantially adsorbs nor absorbs water at room temperature.

Examples of monomers suitable for use as the A monomer include the esters of either acrylic acid or methacrylic acid with non-tertiary alcohols such as ethanol, 1-propanol, 2-propanol, 1-butanol, 2-butanol, 1-pentanol, 2-pentanol, 3-pentanol, 2-methyl-1-butanol, 1-hexanol, 2-hexanol, 2-methyl-1-pentanol, 3-methyl-1-pentanol, 2-ethyl-1-butanol, 3,5,5-trimethyl-1-hexanol, 3-heptanol, 1-octanol, 2-octanol, isooctylalcohol, 2-ethyl-1-hexanol, 1-decanol, 1-dodecanol, 1-tridecanol, 1-tetradecanol and the like. The preferred A monomer is the ester of acrylic acid with butyl alcohol or isooctyl alcohol or a combination thereof, although combinations of two or more different A monomers are suitable.

Monomer A is preferably present in an amount of 50 to 80% by weight based on the total monomer content used to prepare the terpolymer. More preferably monomer A is present in an amount of 60 to 75% by weight.

The B monomer useful in preparing the terpolymer is polar and is copolymerizable with the A and C monomers. It is either BCEA or a salt thereof, or a mixture of BCEA or a salt thereof and vinyl carboxylic acid such as acrylic acid or a salt thereof. Examples of useful vinyl carboxylic acids include acrylic acid, methacrylic acid, itaconic acid, maleic acid and fumaric acid. BCEA is a commercially available material. It is provided as a mixture of ingredients. For example, BCEA is available from Rhone Poulenc, Cranbury, N.J. as a mixture of 20 weight % acrylic acid, 40 weight % BCEA and 40 weight % other acrylic acid oligomers. Preferably, the amount of B monomer mixture used to prepare the polymer is in the range of 10-20 weight %.

A neutralizing agent is employed in the present invention. It is employed at a level sufficient to neutralize at least 50% of the adhesive copolymer acid moiety. Excess neutralizing agent, i.e., up to 2 equivalents of neutralizing per acid group may be employed. Preferably from 0.75 to 1.5 (more preferably from 1 to 1.5) equivalents of neutralizing agent per acid group are employed. Neutralization is achieved via the use of an alkali metal hydroxide or a combination of an alkali metal hydroxide with a minor amount of another neutralizing agent. A wide variety of other neutralizing agents may be used as will be understood by those skilled in the art. The selection of the other neutralizing agent, and the amount employed may be varied to achieve a desired result. However, the type and amount selected must not render the adhesive non-dispersible. Preferably sodium and potassium hydroxide are used as neutralizing agents.

The C monomer useful in preparing the terpolymer is a water-dispersible macromolecular monomer. Preferably the C monomer contains only one vinyl group copolymerizable with the A and B monomers.

Typically, the C monomer contains a plurality of hydrophilic sites which impart the required hydrophilicity of the monomer. Monomer C may be represented by the general formula I $$X-Y-Z \qquad (I)$$

wherein X is a structural element comprising a moiety copolymerizable with the A and B monomers, Y is a divalent linking group, and Z is the hydrophilic site and comprises a water-dispersible group that contains two or more monomer units which are essentially unreactive under free radical initiated copolymerizing conditions employed to form the pressure sensitive adhesive polymer.

A preferred X group of the C monomer is a vinyl group of the general formula II $$H_2C=CR^1- \qquad (II)$$

wherein $R^1$ is a hydrogen atom or a methyl group.

A preferred Y group of the C monomer is a divalent carbonyl group.

A preferred Z moiety of the C monomer is an oligomeric/polymeric material with a molecular weight of 300 to 30,000, preferably from 350 to 5,000 and more preferably from 400 to 750. Preferably, the Z moiety is a polyethoxyloxazoline or a poly-n-vinylpyrrolidone or a polyalkyleneoxide structure. It is also possible to use a Z compound which is a copolymer of different compounds, e.g. a N-vinylpyrrolidone and acrylamide. If such a copolymer is prepared, one of the monomers, e.g. the acrylamide is present only in minor amounts, that is less than 10% by weight.

C monomers of the type useful for the invention can be easily prepared. One method of preparing C monomers uses commercially available preformed polymeric Z moieties and conventional chemical reactions for modifying them. For example, a mono-methoxypolyethlyeneglycolacrylate monomer can be prepared by esterification of a monohydroxyl-terminated poly(-lower alkylene oxide) compound in an appropriate solvent. To the solution is added a $\alpha,\beta$-unsaturated carboxylic acid, preferably in presence of p-toluene sulfonic acid and refluxed for generally 16 to 18 hours. Excess acid is neutralized and the precipitate is filtered off.

Suitable monohydroxyl terminated poly(lower alkylene oxides) which may be used to prepare the C monomers using the above described procedure include Carbowax TM 750, Carbowax TM 550 and Carbowax TM 350.

The C monomer can also be prepared by an addition reaction in which an isocyanate is reacted with a monohydroxyl or monoamine terminated poly(lower alkylene oxides) as well as other Z moieties as described above. For example a benzylisocyanate having a vinylic double bond in the side chain may be reacted with a monoamine terminated poly(lower alkylene oxide). The components are mixed and reacted for a few hours for quantitative conversion. A suitable monoamino terminated poly(lower alkylene oxide) is for example Jeffamine TM M 600 (Texaco).

The C monomer can be also prepared by first synthesizing a suitable Z moiety and then converting it to a macromolecular monomer using known methods. For example, the Z moiety may be formed by radical polymerization of N-vinylpyrrolidone and acrylamide in the presence of a chain transfer agent, for example aminoethanethiol, using a radical chain initiator, for example azobisisobutyronitrile, in an appropriate organic solvent. Then, in a second step, the X and Y moiety containing compound is reacted with the Z-moiety which bears primary amine groups as a result of the chain transfer reaction. A suitable reagent for introducing the X and Y groups is vinyl azlactone (available from SNPE, France). The vinyl-azlactone ring can be opened yielding the C monomer.

Monomer C is preferably present in an amount of from 10 to 30% by weight, more preferably in the amount of 15 to 25% by weight of the total monomers.

As discussed above the adhesive of the invention can employ a number of other materials. However, it must employ less than about 0.1 part of plasticizer per part of polymer. It has been discovered that employing more than this level of plasticizer materially and adversely affects the static shear strength of the adhesive.

The ratio of plasticizer to the polymer employed in the composition of the invention is, therefore, quite limited. It is preferred that the ratio be 0.05:1 or less and most preferred that the ratio be 0.02:1 or less.

Tackifiers may be used in the adhesive of the invention. However, it has been found that the use of minor amounts of tackifier greatly decreases the ability of the adhesive to withstand sterilization conditions when applied to certain fabrics. For example, as little as 0.05 part of tackifier per part of polymer does not cause a failure of the adhesive on a cotton/polyester fabric after sterilization. On the other hand, there is a failure of such an adhesive on a fluorochemically treated wrapper after sterilization. As a result, one must carefully select the level of any tackifier used to meet the intended use for the adhesive.

Within the scope of the invention, it is preferred that the ratio of tackifier used be less than 0.2 part per part of polymer. More preferably the ratio of tackifier to polymer is in the range of 0.05:1 or less.

In the context of the preceding discussion, tackifiers are materials that have a glass transition temperature higher than that of the base polymer while plasticizers are materials that have a glass transition temperature lower than that of the base polymer.

The cohesive strength of the adhesive of the invention can also be adjusted, if desired, through the use of covalent crosslinkers to impart cohesiveness up to a point where the dispersibility is not affected adversely. It may be desirable in some instances in the practice of the invention to increase internal strength or cohesiveness of the terpolymer by crosslinking the terpolymer using conventional methods. Any of several well known chemical crosslinking agents may also be used. Preferably the crosslinkers have low resultant toxicity to skin.

Additionally, it may be possible to employ reinforcing materials such as carbonylamido group containing polymers in the adhesive of the invention. Such materials are disclosed in U.S. Pat. No. 4,871,812 (Lucast et al). The level of such materials employed in the invention should not destroy the water dispersibility of the adhesive of the invention.

A typical procedure for preparing the pressure sensitive adhesive composition of the present invention is as follows.

The monomers A, B and C are preferably dissolved in an organic solvent, and copolymerized in presence of a radical chain initiator, such as azobisisobutyronitrile, and held at elevated temperature, such as 45° to 80° C., for several hours.

The resulting polymer solution may then be combined with the optional additives, e.g., the minor amounts of plasticizer and tackifier, if any, and other adjuvants, e.g., the crosslinker, if any, and the neutralizing agent. Alternatively, the neutralizing agent, plasticizer, tackifier and or other additives may be added before the polymerization process. The blended pressure sensitive adhesive composition typically comprises from about 20% to 60% by weight in the solvent. The preferred organic solvent system comprises ethyl acetate, methanol and isopropanol.

Products which employ the pressure sensitive adhesive of the invention may be made by applying the adhesive composition to one or more surfaces of a substrate. The substrate may be paper, cloth or a polymeric film. Examples of useful backings include paper, latex-saturated paper, foil, woven and nonwoven webs, polyolefin-based films such as polyethylene, polypropylene (including isotatic polypropylene), polystyrene, polyester, polyvinyl alcohol and the like. The adhesive tape may also be provided as a transfer adhesive fortified with fibers for easy handling.

Release liners known to those skilled in the art may cover and protect the exposed surfaces of the pressure sensitive adhesive between manufacturing and use. Commercially available release liners include siliconized paper release liners.

The invention is further illustrated by the following nonlimiting examples. Various tests were used to obtain the data set forth in the examples. A description of the test procedures will facilitate the evaluation of characteristics of the dispersible pressure sensitive adhesive composition or construction.

Test Procedures

Initial adhesion to untreated and treated sterilization wrappers

Samples of a fluorochemically-treated polyester wrapper (available from Standard Textile Co., Cincinnati, OH as WrapPel ™ T) and a untreated 50% cotton/50% polyester wrapper (available from Standard Textile Co., Cincinnati, Ohio as Barrier Supreme ™) were cut into 5.08 cm by 15.24 cm strips. Example indicator tapes of the invention were applied to the untreated and treated wrappers, and were rolled twice with a 2 kg rubber roller.

One end of each of the sample wrappers was adhered to a set of jaws on an Instron Model 1122 tensile tester (Instron Corp., Canton, Mass.), while the corresponding end of the laminated indicator tape was adhered to an opposing set of jaws of the tensile tester. The example indicator tape was peeled from the surface of the treated and untreated wrappers at a essentially a 90° peel angle. The rate of jaw movement was 25.4 cm/minute and the tensile tester recorded the force required to separate the tape laminate from the wrapper. The results were recorded in Newtons per 2.54 cm. The initial adhesion measurement derives from the fact that the dwell time of the tape on the wrapper was short; i.e., the example tape was applied and peeled without a long residence time (i.e., less than 5 minutes) in between, and sterilization had not yet taken place.

Post-sterilization adhesion to untreated and treated sterilization wrappers

The same method as the initial adhesion test was used for this test, except that prior to testing, the laminate of the example indicator tapes and treated and untreated wrappers was steam sterilized at a setting of 270° F. (132° C.), in a 4 minute, four-pulse prevacuum cycle with a 1 minute steam dry time. The sterilizer used was an Eagle 2013 sterilizer (American Sterilizer Co., Erie, Pa.). In addition, the laminate was allowed to cool at room temperature for a minimum of 4 hours before peel testing. The results were recorded in Newton per 2.54 cm.

Pre-sterilization wrapper closure ($T_{(0)}$)

A bundle was produced by rolling towels to a cylindrical size of approximately 25.4 cm in length by 12.7 cm in diameter. The bundle of towels were then wrapped using either a 76.2 cm² untreated 50% cotton/50% polyester wrapper, or a fluorochemically-treated polyester wrapper as described above by placing the towel cylinder diagonally on one of the wrapper corners, and rolling the cylinder towards an opposing corner, while tucking in side corners. Once completely wrapped, the bundle or pack was securely closed with an example pressure sensitive adhesive indicator tape.

The wrapped bundle was allowed to sit at room temperature (20° C., 50% R.H.) for 12 hours. The packs were inspected to assure that they remained closed. The results were recorded as follows: Pass means the bundle remains closed with less than 0.5 in (1.27 cm) edge lift; Fail means the bundle is either no longer closed or there is greater than 0.5 in (1.27 cm) tape edge lift.

Post-sterilization wrapper closure ($T_{(A)}$)

A wrapped bundle was produced as described above for the pre-sterilization wrapper closure test, except that the bundle was immediately exposed to a steam sterilization cycle at 132° C., 10 minutes, four-pulse prevacuum cycle and a one minute steam dry time. The packs were inspected to assure that they remained closed and the adhesive remained intact. The results were recorded as follows: Pass means the bundle remained closed with less than 0.5 in (1.27 cm) tape edge lift; Fail means the bundle is either no longer closed or there is greater than 0.5 in (1.27 cm) tape edge lift.

Dispersibility test

Wrapped bundles were prepared using untreated 50% cotton/50% polyester wrappers and fluorochemically-treated polyester (WrapPel ™ T) wrappers, and were sterilized as described in the Post-sterilization Wrapper Closure Test. The wrappers were removed from the bundle, with the example indicator tapes adhered to the wrappers, and laundered in a 60 lb. commercial washing machine (Milnor washer, Model No. 36021BWE/AEA; Pillerin Milnor Corp., Kenner, La.). The wrappers went through a typical laundry cycle for surgical linens including: (a) a three-minute cold alkaline break in a 0.1% Paralate 55 GL11 ™ Commercial Liquid Laundry Alkali (Ecolab Inc., St. Paul, Min.); a three-minute cold water flush, an eight-minute hot break/suds wash using 0.1% of Paralate 55 GLW ™ Commercial Liquid Laundry Alkali, and 0.05% Kindet ™ Commercial Liquid Laundry Detergent (Ecolab Inc.); two three-minute hot water flushes; a three minute cold water flush; a three-minute cold sour/soft rinse using 0.05% Tri Liquid Sour 55GL ™ Commercial Liquid Laundry Sour (Ecolab Inc.), and 0.05% Tex Special Liquid ™ Commercial Liquid Denim Lubricant/Softener (Ecolab Inc.), and a six minute extraction to remove excess liquid.

Each laundered wrapper was inspected for a pass, meaning that no adhesive residue remained on the wrapper, or for a fail, meaning that there was an adhesive residue on the wrapper.

An adhesive which passes with either wrapper is acceptable and within the scope of the invention.

"C" Monomer preparation

Polymeric vinyl terminated monomer identified in the claims and herein as "C" monomer is prepared as described below. The "C" monomers are identified in the forgoing descriptions and in the Tables as "C" monomers "C-1"–"C-2". In these preparations, the term "parts" means parts by weight unless otherwise noted.

Monomer "C-1"

A mono-methoxypolyethyleneglycolacrylate monomer with a molecular weight of 750 was prepared by Fischer esterification of Carbowax ™ 750 (Union Carbide). One hundred parts of the Carbowax ™ 750 and 100 parts of toluene were introduced to a flask which was equipped with a Dean-Stark condenser and a stirrer. The solution was heated to reflux-temperature for two hours. 11.3 parts of acrylic acid, 4.5 parts of p-toluene sulfonic acid, 3,000 ppm of Irganox ™ PS 800 (Ciba-Geigy) and 500 ppm phenothiazine were added into this mixture. The solution was heated to reflux-temperature for another 16 hours. After cooling down to room temperature, excess acid was neutralized with 4.5 parts of calcium hydroxide. The formed precipitate was filtered off. Subsequently the toluene was evaporated under reduced pressure to yield a solid 100% acrylate monomer.

Monomer "C-2"

NK-Ester AM-90G, commercially available from Shin-Nakamura Chemical Co., Ltd., average molecular weight approximately 450.

Polymer Preparation

A series of pressure sensitive adhesive polymers were prepared by charging butyl acrylate (BA), BCEA (commercially available as a mixture of 20 weight % acrylic acid, 40 weight % BCEA, 40 weight % other acrylic acid oligomers from Rhone Poulenc), monomer C-1 or C-2 to a one quart bottle containing a solvent mixture of ethyl acetate, methanol and isopropanol, and 0.51 grams azobisisobutyronitrile. The monomer charge comprised between 32 and 34% of the polymerization mixture. The mixture was deoxygenated by purging with one liter per minute nitrogen for two minutes. The bottle was sealed and placed in a rotating water bath at 55° C. for 24 hours to effect essentially complete polymerization. The inherent viscosity (IV) of the resultant polymer was then measured in 2-butanone at 27.5° C. The composition of the adhesives and their IV values are reported in Table 1.

AMOCO Chemical Corp., Chicago, Ill.); 15% tetramethylthirum disulfide accelerator (RT Vanderbilt Co., Norwalk, Conn.); and 45% ortho-pentamethylenethiuram sulfads (RT Vanderbilt Co.).

The printed, saturated paper backing was then treated to decrease moisture penetration with a solution contained 19% butyl alcohol, 0.2% phosphoric acid, 9% urea, 0.8% aqueous ammonia, 31% formaldehyde, 6% isopropyl alcohol, 10% acrylic polymer ("Elvacite 2044"; E.I. dupont Nemours, Wilmington, Del.); 9% butanol and 15% xylene.

The pressure sensitive adhesives in the solvent system were coated on the Kraft paper at 0.68 grams per 154.8 cm$^2$ (24 in$^2$) using a standard laboratory knife coater, with drying for 15 minutes in a forced air oven at 100° C.

Table 2 shows which formulations of the water-dispersible, pressure sensitive adhesives of the invention were coated on the saturated backings to produce the tapes of Examples 1–6 and Comparative Examples 1 and 2. Tables 3 and 4 show the initial adhesion, post-

TABLE 1

| | Composition of Pressure Sensitive Adhesive | | | | | |
|---|---|---|---|---|---|---|
| | Monomer A | Monomer B | Monomer C | | | |
| Polymer | BA | BCEA | C-1 | C-2 | Solvent Blend (g) | IV (dl/g.) |
| 1 | 65 | 15 | 20 | | 154.7/155.2/6.4 | 1.00 |
| 2 | 77.5 | 2.5 | 20 | | 161.7/161.7/6.6 | 1.10 |
| 3 | 75 | 5 | 20 | | 161.7/161.7/6.6 | 1.07 |
| 4 | 60 | 20 | 20 | | 162.5/162.5/4.95 | 1.10 |
| 5 | 50 | 30 | 20 | | 162.9/162.9/4.125 | 1.03 |
| 6 | 55 | 15 | 30 | | 161.7/161.7/6.6 | 1.08 |
| 7 | 75 | 15 | 10 | | 163.35/163.35/3.3 | 1.02 |
| 8 | 65 | 15 | | 20 | 161.7/161.7/6.6 | 1.18 |

Solvent Blend = Ethyl acetate/methanol/isopropanol

EXAMPLES 1–6 AND COMPARATIVE EXAMPLES 1 AND 2

The alkali neutralizing agent, if any, in a 3.57N 50:50 methanol and water (v/v) solution was blended into the adhesive compositions of Examples 1–8. The mixture was agitated to produce a colorless to amber, low viscosity solution. The resultant neutralized adhesive compositions were applied to a 29 pound basis weight Kraft paper (M-2383 Smooth Crepe Semi-Bleached Kraft Saturating Paper from Mosinee Paper Corporation of Mosinee, Wisc.) to form a sterilization indicator tape as described below.

The Kraft paper was gravure printed in lines with a sulfur-lead ink system in a binder system. The ink system contained 38% binder, 23% sulfur, 15% lacquer thinner, 23% lead carbonate and 1% clay ("Bertone-38"; NL Chemicals, Hightstown, N.J.). The binder system contained 24% nitrocellulose ethyl alcohol; 3% phenol-formaldehyde resin ("Beckcite 24-102"; BTL Specialty Resins, Toledo, Ohio); 9% tricresyl phosphate; 14% butyl alcohol; 27% xylene and 23% butyl acetate.

The ink printed Kraft paper was strengthened using a vulcanized natural rubber-wood rosin system coated onto the paper. The rubber system was 23% natural rubber (Goodyear Tire and Rubber Co., Akron, Ohio); 6% zinc oxide (Sherwin Williams, Cleveland, Ohio); 3% titanium dioxide ("Type A-140"; New Jersey Zinc Co., Palmerton, Pa.); 29% wood rosin ("Tenex 36-710"; Reichold Chemicals Inc., Oakbrook, Ill.); 2% calcium lithol pigment (Hercules Inc.); and 37% mineral spirits. The vulcanizer used to crosslink the rubber system was 40% white mineral oil (Type #31 USP;

sterilization adhesion, pre-sterilization wrapper closure (T(0)), post-sterilization wrapper closure (T(A)), and dispersibility of the indicator tapes of Examples 1–6 and Comparative Examples 1 and 2 on untreated 50% cotton/50% polyester wrappers and fluorochemically-treated polyester wrappers respectively.

When interpreting the results contained in Tables 3–4, the data should be analyzed for trends as opposed to specific numerical values. This is due to the inherent variability in the test wrappers. This variability arises, at least in part, from the wearing effects of age, harshness of wash conditions, and residual chemicals present from laundering.

TABLE 2

| Adhesive Formulations Employed in Examples 1–6 and Comparative Examples 1 and 2 | | | |
|---|---|---|---|
| Example No. | Polymer | Neutralizing Agent* | Neutralization (Equivalents) |
| 1 | 1 | KOH | 1.25 |
| C-1 | 2 | KOH | 1.25 |
| C-2 | 3 | KOH | 1.25 |
| 2 | 4 | KOH | 1.25 |
| 3 | 5 | KOH | 1.25 |
| 4 | 6 | KOH | 1.25 |
| 5 | 7 | KOH | 1.25 |
| 6 | 8 | KOH | 1.25 |

*86.8% pure KOH. Equivalents used based on 100% pure KOH in all examples

TABLE 3

Untreated 50% Cotton/50% Polyester Wrappers

| Ex. No. | Initial Adhesion (Newton/2.54 cm) | Post-Sterilization Adhesion (Newton/2.54 cm) | Wrapper Closure T(O) (pass/fail) | Wrapper Closure T(A) (pass/fail) | Dispersibility (pass/fail) |
|---|---|---|---|---|---|
| 1 | 0.219 | 5.441 | Pass | Pass | Pass |
| C-1 | 0.715 | 8.031 | Fail | Fail | Fail |
| C-2 | 0.295 | 6.588 | Pass | Pass | Fail |
| 2 | 0.229 | 6.522 | Pass | Pass | Pass |
| 3 | 0.082 | 5.949 | Pass | Pass | Pass |
| 4 | 0.177 | 4.327 | Pass | Pass | Pass |
| 5 | 0.15 | 2.982 | Pass | Pass | Pass |
| 6 | 0.295 | 5.081 | Pass | Pass | Pass |

TABLE 4

Fluorochemically-Treated Wrappers

| Ex. No. | Initial Adhesion (Newton/2.54 cm) | Sterilized Adhesion (Newton/2.54 cm) | Wrapper Closure T(O) (pass/fail) | Wrapper Closure T(A) (pass/fail) | Dispersibility (pass/fail) |
|---|---|---|---|---|---|
| 1 | 0.150 | 0.635 | Pass | Pass | Pass |
| C-1 | 0.334 | 2.933 | Fail | Fail | Fail |
| C-2 | 0.268 | 0.617 | Pass | Pass | Fail |
| 2 | 0.131 | 1.147 | Pass | Pass | Pass |
| 3 | 0.079 | 0.492 | Pass | Fail | Pass |
| 4 | 0.066 | 0.819 | Fail | Pass | Pass |
| 5 | 0.098 | 0.784 | Fail | Fail | Pass |
| 6 | 0.187 | 1.344 | Pass | Pass | Pass |

EXAMPLES 7–13 AND COMPARATIVE EXAMPLE 3

The tapes of Examples 7–13 and Comparative Example 3 utilize the same backing and polymer as Example 1. However, the equivalents of neutralizing agent were varied. Table 5 shows the equivalents of neutralizing agent and the initial adhesion, post-sterilization adhesion, pre-sterilization wrapper closure (T(0)), post-sterilization wrapper closure (T(A)) and dispersibility test results for the indicator tapes of Examples 7–13 and Comparative Example 3 on untreated 50/50 cotton/polyester wrappers. Table 6 shows the results of the same tests for the indicator tapes of Examples 7–13 and Comparatives Example 3 on fluorochemically-treated polyester wrappers.

TABLE 5

Untreated 50% Cotton/50% Polyester Wrappers

| Ex. No. | Neutralizing Agent (Equivalents) | Initial Adhesion (Newton/-2.54 cm) | Post-Sterilize Adhesion (Newton/-2.54 cm) | Wrapper Closure T(O) (pass/fail) | Wrapper Closure T(A) (pass/fail) | Dispersibility (pass/fail) |
|---|---|---|---|---|---|---|
| C-3 | 0 | 0.819 | 7.210 | Pass | Pass | Fail |
| 7 | 0.5 | 0.737 | 6.457 | Pass | Pass | Fail |
| 8 | 0.75 | 0.794 | 4.982 | Pass | Pass | Pass |
| 9 | 1 | 0.888 | 5.277 | Pass | Pass | Pass |
| 10 | 1.25 | 0.219 | 5.441 | Pass | Pass | Pass |
| 11 | 1.5 | 0.681 | 4.589 | Pass | Pass | Pass |
| 12 | 2 | 0.794 | 4.392 | Pass | Pass | Pass |
| 13 | 3 | 0.941 | 3.343 | Pass | Pass | Pass |

TABLE 6

Fluorochemically-Treated Wrappers

| Ex. No. | Neutralizing Agent (Equivalents) | Initial Adhesion (Newton/-2.54 cm) | Post-Sterilize Adhesion (Newton/-2.54 cm) | Wrapper Closure T(O) (pass/fail) | Wrapper Closure T(A) (pass/fail) | Dispersibility (pass/fail) |
|---|---|---|---|---|---|---|
| C-3 | 0 | .813 | .622 | Fail | Fail | Fail |
| 7 | 0.5 | .662 | .656 | Pass | Pass | Pass |
| 8 | 0.75 | .534 | .377 | Pass | Pass | Pass |
| 9 | 1 | .445 | .590 | Pass | Fail | Pass |
| 10 | 1.25 | .150 | .635 | Pass | Pass | Pass |
| 11 | 1.5 | .275 | .377 | Fail | Fail | Pass |
| 12 | 2 | .285 | .393 | Fail | Fail | Pass |
| 13 | 3 | .318 | .318 | Fail | Fail | Pass |

EXAMPLES 14–17

The tapes of Examples 14–17 utilize the same backing and polymers as Example 1. The polymer was neutralized with 1.25 equivalents of KOH. Varying amounts of a tackifier were employed. The tackifier was Foral AX (a colophony acid tackifier commercially available from the Hercules Corporation of Wilmington, Del.). The results are in Tables 7 and 8.

TABLE 7

Untreated 504 Cotton/50% Polyester Wrappers

| Ex. No. | Tackifier (Parts) | Initial Adhesion (Newton/-2.54 cm) | Post-Sterilization Adhesion (Newton/-2.54 cm) | Wrapper Closure T(O) (pass/fail) | Wrapper Closure T(A) (pass/fail) | Dispersibility (pass/fail) |
|---|---|---|---|---|---|---|
| 1 | 0 | 0.219 | 5.441 | Pass | Pass | Pass |

TABLE 7-continued

Untreated 504 Cotton/50% Polyester Wrappers

| Ex. No. | Tackifier (Parts) | Initial Adhesion (Newton/-2.54 cm) | Post-Sterilization Adhesion (Newton/-2.54 cm) | Wrapper Closure T(O) (pass/fail) | Wrapper Closure T(A) (pass/fail) | Dispersibility (pass/fail) |
|---|---|---|---|---|---|---|
| 14 | .05 | 0.554 | 5.703 | Pass | Pass | Pass |
| 15 | 0.1 | 0.750 | 6.457 | Pass | Pass | Pass |
| 16 | 0.2 | 0.954 | 7.834 | Pass | Pass | Pass |
| 17 | 0.5 | 1.003 | 6.129 | Pass | Pass | Fail |

TABLE 8

Fluorochemically-Treated Wrappers

| Ex. No. | Tackifier (Parts) | Initial Adhesion (Newton/-2.54 cm) | Post-Sterilization Adhesion (Newton/-2.54 cm) | Wrapper Closure T(O) (pass/fail) | Wrapper Closure T(A) (pass/fail) | Dispersibility (pass/fail) |
|---|---|---|---|---|---|---|
| 1 | 0 | 0.150 | 0.635 | Pass | Pass | Pass |
| 14 | .05 | 0.445 | 0.803 | Pass | Fail | Pass |
| 15 | 0.1 | 0.616 | 0.393 | Pass | Fail | Pass |
| 16 | 0.2 | 0.652 | 0.400 | Pass | Fail | Pass |
| 17 | 0.5 | 0.885 | 1.114 | Pass | Fail | Pass8 |

EXAMPLES 18 AND COMPARATIVE EXAMPLES 4-6

The tapes of these Examples utilize the same backing and polymers as Example 1. The polymer was neutralized with 1.25 equivalents of KOH. Varying amounts of a plasticizer were employed. The plasticizer was an alpha-(nonylphenyl)-omega-hydroxyphosphate available as RHODAFAC PE-510 TM from Rhone Poulenc, Cranbury, N.J. (formerly made by GAF Corporation as GAFAC PE-510 TM ). The results are set out in Table 9.

The tapes were tested for static shear strength as follows. A stainless steel plate was washed with diacetone and wiped with a tissue (KIM-WIPE) and then washed again with heptane followed by wiping with a tissue. The heptane wash was repeated two more times. A length of the tape was applied to the washed stainless steel plate to provide a 2.54 cm by 2.54 cm bond area. The remainder of the tape hung over the edge and was doubled back to form a loop. A 2 kg roller was passed back and forth over the bond area once in the machine direction. A 500 g weight was hung from the loop and the resulting assembly hung vertically in a room maintained at 20° C. and 50% relative humidity. The time to failure (i.e., the time for the tape to fall from the stainless steel plate) was measured.

TABLE 9

| Ex. No. | Plasticizer (Parts) | Static Shear to Steel (min.) |
|---|---|---|
| 1 | 0 | 1772 |
| 18 | 0.05 | 1228 |
| C-4 | 0.1 | 509 |
| C-5 | 0.2 | 316.5 |
| C-6 | 0.5 | 108.5 |

The data shows that there is a dramatic decrease in the static shear strength of the adhesive when 0.1 part or more of plasticizer per part of the polymer are used.

We claim:

1. A pressure sensitive adhesive composition which is dispersible at an alkaline pH but not at an acidic or neutral pH, comprising (a) a polymer formed from A, B, and C monomers wherein A is a hydrophobic monomer selected from the group consisting of an acrylic or a methacrylic ester of a non-tertiary alcohol having from 2 to 14 carbon atoms, wherein A comprises from 50 to 80% by weight of A plus B plus C B is a monomer which contains (1) β-carboxyethyl acrylate or a salt thereof, (2) a mixture of the β-carboxyethyl acrylate or the salt thereof and a vinyl carboxylic acid or a salt thereof other than the carboxyethyl acrylate or the salt of the carboxyethyl acrylate, wherein B comprises from 10 to 30% by weight of A plus B plus C, and wherein the carboxylic acid groups of said polymer have been neutralized with from about 0.5 to about 2 equivalents of an alkali metal hydroxide per carboxylic acid group, and wherein when the mixture of the β-carboxyethyl acrylate and the vinyl carboxylic acid is used, the β-carboxyethyl acrylate comprises at least 10% by weight of A plus B plus C, and C is a water-dispersible macromolecular monomer which has the formula X—Y—Z wherein X is a moiety copolymerizable with A and B, Y is a divalent linking group which joins X to Z and Z is a water-dispersible group which contains at least two units which are essentially unreactive under free radical initiated copolymerization conditions used to form the polymer, and wherein C comprises from 10 to 30% by weight of A plus B plus C; and (b) less than about 0.1 part of a plasticizer per part of said polymer.

2. The pressure sensitive adhesive of claim 1 wherein said carboxylic acid groups have been neutralized with from 0.75 to 1.5 equivalents of said alkali metal hydroxide per carboxylic acid group.

3. The pressure sensitive adhesive of claim 1 wherein said A monomer comprises from 60 to 75% by weight of A plus B plus C, said B monomer comprises from 10 to 20% by weight of A plus B plus C, and said C monomer comprises from 10 to 30% by weight of A plus B plus C.

4. The pressure sensitive adhesive of claim 1 wherein said B monomer is a mixture of β-carboxyethyl acrylate, acrylic acid, and acrylic acid oligomers.

5. The pressure sensitive adhesive of claim 1 wherein said C monomer has a weight average molecular weight in the range of 350 to 5,000.

6. The pressure sensitive adhesive of claim 5 wherein said C monomer has a weight average molecular weight in the range of 400 to 750.

7. The pressure sensitive adhesive of claim 5 wherein said C monomer has an inherent viscosity of from 0.7 to 1.5 dl/g in 2-butanone at 27.5° C.

8. A pressure sensitive adhesive tape comprising a layer of pressure sensitive adhesive of claim 1.

9. The pressure sensitive adhesive tape of claim 8 further comprising a supporting layer carrying said pressure sensitive adhesive layer on at least one surface thereof.

10. The pressure sensitive adhesive tape of claim 9 wherein said supporting layer is a release liner.

11. The pressure sensitive adhesive tape of claim 9 wherein said supporting layer and said pressure sensitive adhesive layer are anchored to one another.

12. The pressure sensitive adhesive tape of claim 11 wherein said supporting layer is dispersible at an alkaline pH.

13. The pressure sensitive adhesive tape of claim 11 wherein said supporting layer is polymeric.

14. The pressure sensitive adhesive tape of claim 13 wherein said polymeric layer is dispersible at an alkaline pH.

15. The pressure sensitive adhesive tape of claim 9 wherein said supporting layer carries said pressure sensitive adhesive on opposed surfaces thereof.

16. A fabric bearing a portion of the pressure sensitive adhesive tape of claim 8.

17. A fabric according to claim 16 in the form of a mammalian body covering.

18. A closure system comprising an article to be closed and a portion of the pressure sensitive adhesive tape of claim 8.

19. The pressure sensitive adhesive tape of claim 11 in the form of a sterilization indicator.

20. A polymer film bearing a portion of the pressure sensitive adhesive tape of claim 8.

21. A polymer film according to claim 20 in the form of a mammalian body covering.

* * * * *